US008064501B2

(12) United States Patent
Clausen

(10) Patent No.: US 8,064,501 B2
(45) Date of Patent: Nov. 22, 2011

(54) METHOD AND APPARATUS FOR GENERATING A PERIODIC TRAINING SIGNAL

(75) Inventor: Axel Clausen, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 872 days.

(21) Appl. No.: 11/311,703

(22) Filed: Dec. 19, 2005

(65) Prior Publication Data

US 2006/0133467 A1 Jun. 22, 2006

(30) Foreign Application Priority Data

Dec. 22, 2004 (DE) .......................... 10 2004 061 854

(51) Int. Cl.
*H04B 1/38* (2006.01)

(52) U.S. Cl. ........ 375/219; 375/222; 375/355; 375/232; 370/208; 370/260; 370/210

(58) Field of Classification Search ................ 375/219
See application file for complete search history.

(56) References Cited

U.S. PATENT DOCUMENTS

| | | | | | |
|---|---|---|---|---|---|
| 4,490,754 A | * | 12/1984 | Kluth | ................ | 386/96 |
| 4,807,171 A | * | 2/1989 | Gale | ................ | 708/200 |
| 5,694,522 A | * | 12/1997 | Hiratsuka et al. | ............. | 704/265 |
| 7,035,326 B1 | * | 4/2006 | Heidari et al. | ................ | 375/229 |
| 7,477,683 B2 | * | 1/2009 | Stopler | ........................ | 375/222 |
| 2004/0120409 A1 | | 6/2004 | Yasotharan et al. | | |
| 2005/0276339 A1 | * | 12/2005 | Chow et al. | ................... | 375/260 |

OTHER PUBLICATIONS

German Office Action dated Oct. 12, 2005.
Chow et al: "Equalizer Training Algorithms for Multicarrier Modulation Systems," *IEEE International Conference on Communications*, vol. 2, May 1993, pp. 761-765.
Minn et al: "Optimal Periodic Training Signal for Frequency Offset Estimation in Frequency Selective Fading Channels," *IEEE International Conference on Communications*, vol. 1, Jun. 2004, pp. 488-492.

* cited by examiner

*Primary Examiner* — Shuwang Liu
*Assistant Examiner* — Lihong Yu
(74) *Attorney, Agent, or Firm* — Eschweiler & Associates, LLC

(57) ABSTRACT

In a method for generating a periodic training signal comprising cyclically expanded training symbols for a transceiver which transmits data via a data transmission channel using a predetermined number N of modulated carrier signals an address pointer for addressing a starting address in a memory is calculated for each training symbol on the basis of cyclic expansion parameters and, starting from the calculated starting address, 2*N stored samples of a transformed training symbol are read cyclically from the memory.

15 Claims, 8 Drawing Sheets

16 QAM (for VDSL)

Windowing:

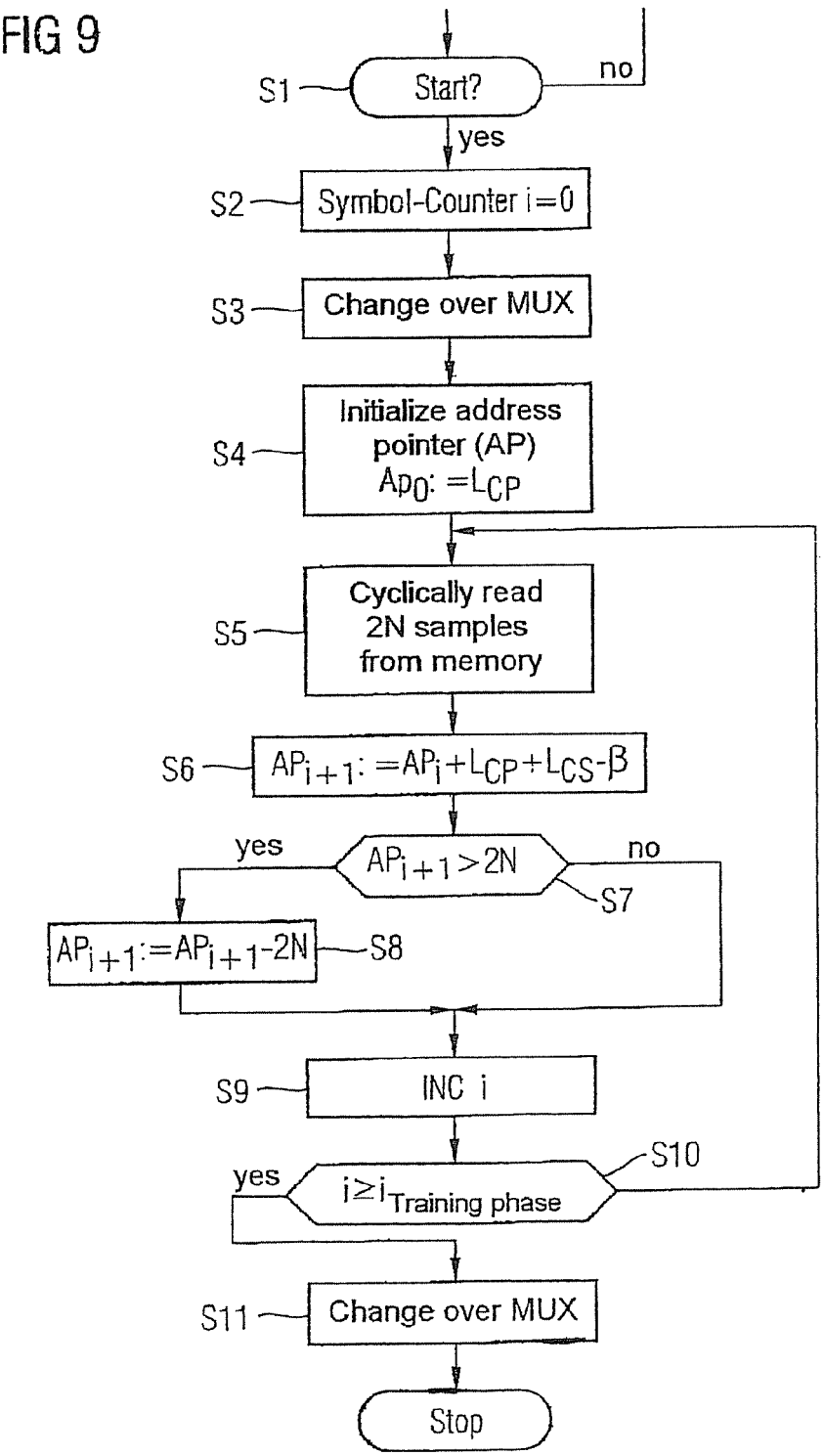

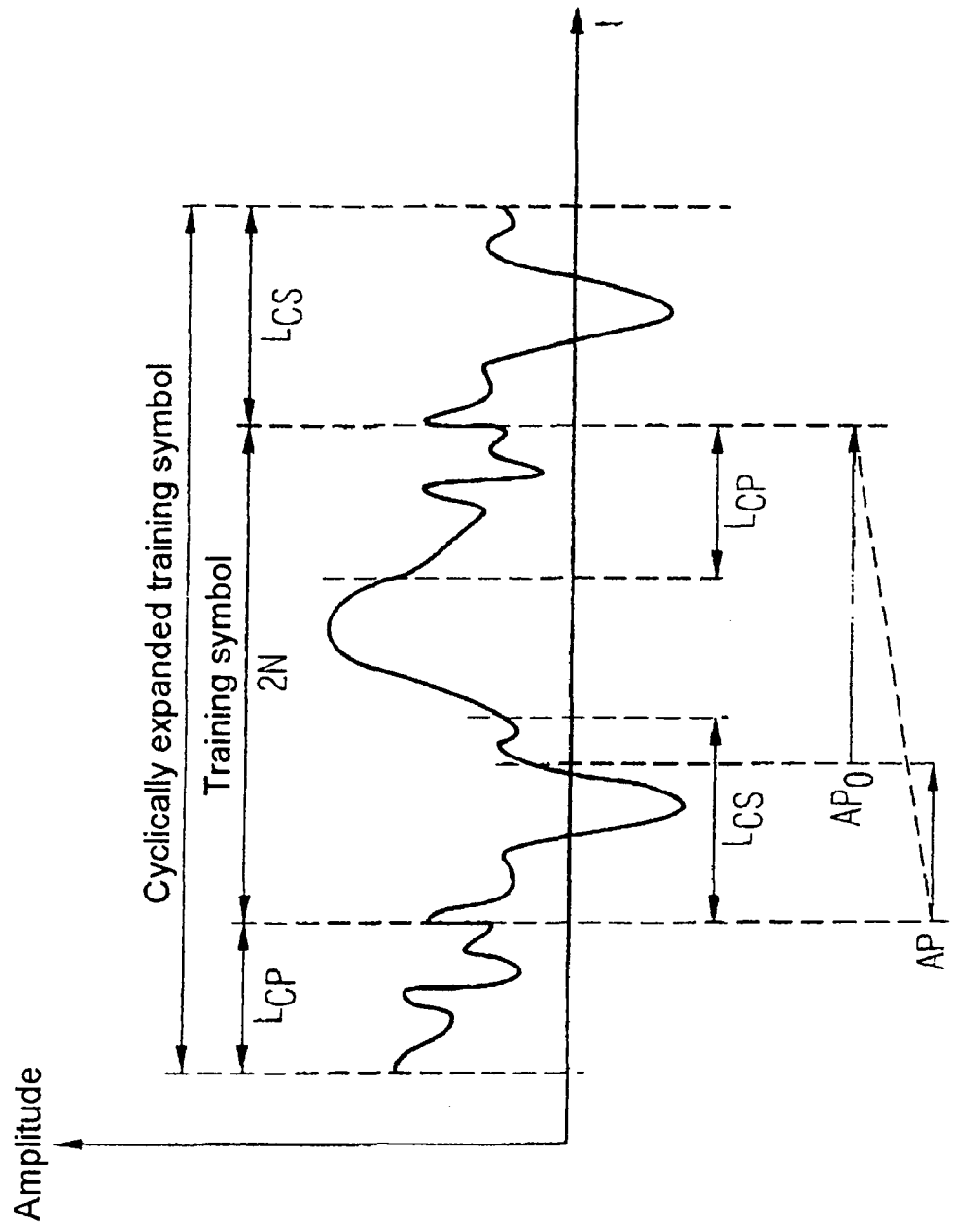

METHOD AND APPARATUS FOR GENERATING A PERIODIC TRAINING SIGNAL

BACKGROUND OF THE INVENTION

1. Field of the Invention

The invention relates to a method and an apparatus for generating a periodic training signal, particularly for an XDSL transceiver.

2. Description of the Prior Art

In modern telecommunication, data transmission at high bit rates on a subscriber line is playing an increasingly large role, since ever more applications, such as video or online gaming, require bi-directional data communication at ever greater data rates.

For transmitting digital data via a transmission channel, a series of modulation techniques for coding and modulating analogue signals which are routed to a reception apparatus via the transmission channel are known.

A technique which is recently becoming more and more significant is "multicarrier data transmission", which is also known as "Discrete MultiTone" (DMT) transmission or as "Orthogonal Frequency Division Multiplexing" (OFDM) transmission. Multicarrier transmission is suitable particularly for data transmission via transmission channels which add linear distortion. In comparison with single-carrier data transmission, advantages also arise with regard to the flexibility when matching the data rate or the transmission spectrum to the transmission channel or to the disturbance environment. Multicarrier transmission is used in conductor-based systems, for example, but also in the radio sector, for broadcast systems and for accessing data networks. Examples of DMT transmission applications are digital broadcast radio (DAB=Digital Audio Broadcast) and digital television (DVB=Digital Video Broadcast), or alternatively mobile radio applications.

An example of a representative of DMT transmission is ADSL technology, ADSL standing for "Asymmetric Digital Subscriber Line", that is to say the digital asymmetric subscriber line via a normal telephone line. ADSL denotes a technology which allows a bit stream at a high bit rate to be transmitted from a control centre to a subscriber and allows a bit stream at a low bit rate to be transmitted from the subscriber to a control centre. This technology makes use of the telecommunication line for conventional telephone services (that is to say voice transmission) and at the same time for data transmission. Besides ADSL technology, there are also further representatives of "xDSL technology", for example the broadband subscriber line (VDSL=Very High speed Digital Subscriber Line), where the frequency range for data transmissions extends up to 17 MHz. There are also plans for VDSL2 applications, which use even higher frequency ranges.

DMT transmission systems use a multiplicity of carrier frequencies, with the data stream to be transmitted being broken down into a large number of parallel substreams which are transmitted using frequency-division multiplexing. These substreams are also called single carriers. For modulation, the transmitted signal is made up of a large number of sinusoidal signals, with every single sinusoidal signal being modulated both in terms of amplitude and in terms of phase. This produces a multiplicity of quadrature-amplitude-modulated (QAM) signals. For DMT transmission, Inverse Fourier Transformation (IFT) is used in the transmitter and Fourier Transformation (FT) is used in the receiver. Fast and efficient signal processing algorithms exist both for the IFT and for the FT.

A problem which accompanies very broadband DMT transmission, in particular, arises as a result of the fact that the usable frequency range in VDSL extends up to 17 MHz and in planned VDSL2 applications extends up to 30 MHz. However, this wide frequency range also contains frequency bands for other services, such as the frequency bands for medium-wave and short-wave broadcast radio or the frequency ranges for amateur radio. Depending on the physical position, the subscriber terminals for the DMT transmission may be subject to interference from these services which use the same frequency range as the DMT transmission. This is referred to as "RFI interference", RFI standing for "Radio Frequency Interference". This RFI interference is narrowband interference for the very broadband frequency range used for DMT transmission, since these interfering RFI frequency ranges have a width of typically just a few kilohertz.

If a narrowband interfering signal of this type is overlaid on the DMT received signal, this has a negative effect on the demodulated DMT received signal. In this case, interference arises not just for the values (carrier frequencies) in the direct vicinity of the centroid frequency of this interference. Carrier frequencies (or user channels) for the DMT received signal which are at a much greater distance from this interfering frequency are also subject to interference.

Besides bandwidth-limited interfering signals, the transmitted modulated signal is also attenuated, linearly distorted and can be overlaid by other extraneous signals. Particularly crosstalk interference may arise when an adjacent line pair or a physically adjacent transmission channel is likewise used to transmit DMT signals. In such a case, the interference takes effect through crosstalk of the entire bandwidth for the DMT signal. Since xDSL, for example, involves a large number of line pairs being routed in a form bundled next to one another, a plurality of sources of crosstalk interference normally arise at the same time, and these have an adverse effect on a modulated analogue signal which is to be transmitted. In such an FEXT (Far End Cross Talk=crosstalk at the other end of the line) environment, it is desirable to take measures to improve the signal quality of the relevant received signals.

In addition to the sources of crosstalk interference and RFI interference, which are relatively easy to describe, the received signal is also usually subject to stochastic noise.

FIG. 1 shows a DMT transmission system based on the prior art.

Digital data DS to be transmitted are first of all supplied to an encoder CD via a serial-parallel converter SPW. Depending on the quality or on a measured signal-to-noise ratio for the single carriers in the multicarrier data transmission, a configuration for a QAM symbol is chosen for each single carrier. The configuration stipulates the number of bits which can be transmitted by a QAM symbol. Thus, a particular number of bits can be transmitted for each single carrier using a QAM channel, which can be represented by a respective complex frequency value. FIG. 2 shows the configuration for a 16 QAM encoder.

The encoder CD associates the data block to be transmitted, which has a particular number of bits, with the single carriers as QAM symbols. The relevant frequency values of this data block for transmission, or else called DMT symbol or DMT frame, can be combined to form a complex frequency vector D ($f_\mu$) FIG. 3 schematically shows the spectrum of a DMT signal modulated with N carrier signals.

In this case, the frequencies $f_\mu$ correspond to the respective single-carrier frequency. A typical VDSL transmission method uses, by way of example, N=4096 carriers at a respective distance of Δf=4.3125 KHz from one another, which exhausts a frequency range or transmission bandwidth of 0-17664 MHz. This frequency vector D(μ), where μ subsequently indicates the frequencies $f_\mu$ of the single carriers, is subjected to Inverse Fourier Transformation, which is illustrated by the function block IFFT in FIG. 1. The Inverse Fourier Transformation provides a real signal vector in the time domain with M=2·(N+1) components. FIG. 4 shows a block diagram of a conventional IFFT unit based on the prior art.

A buffer buffer-stores the real signal vector, which is expanded by a "guard interval" GI (cyclic prefix). The guard interval GI provides a cyclic expansion for the DMT frame. The guard interval GI fills the intervals of time at which DMT frames are successively sent. The signal which has been encoded from the digital data and subjected to Inverse Fourier Transformation has a spectrum with a periodicity of the relevant inverse sampling frequency $T=1/f_A$.

The digitally filtered data signal to be transmitted is converted to analogue using a digital-analogue converter DAW and is bandwidth-limited by an analogue filter AF1.

This analogue bandwidth-limited transmitted signal A(t) is supplied to a line driver LT for amplification and is then passed to an appropriate transmission channel CH. In the case of xDSL, this is a two-wire telephone line, for example. Interfering influences which can adversely alter the modulated analogue signal are illustrated in FIG. 1 as an additionally injected noise signal R(t) as a model. This noise signal R(t) is injected additively.

At the receiver end, the modulated analogue received signal Z(t) which is subject to interference is first of all subjected to analogue filtering AF2 and is then converted to a discrete-time digital received signal $Z(t_k)$ by an analogue-digital converter ADW at the sampling frequency $f_A$. This digital discrete-time received signal $Z(t_k)$ is digitally filtered in a digital filter DF2, is then buffer-stored in a buffer and is divested of the guard interval GI. A device for Fourier Transformation FT is used to convert the received signal into a received signal vector $E(f_\mu)$.

Without disadvantageous influences as a result of the signal processing and particularly as a result of the channel frequency response, the received signal vector $E(f_\mu)$ provides precisely the same complex frequency values as have been produced at the transmission end by the Inverse Fourier Transformation IFFT. In a practical system, however, this is never entirely the case. To eliminate the influences of the frequency response of the transmission channel CH, a frequency range equalizer EF is provided which weights the complex entries in the received signal vector $E(f_\mu)$ with equalization coefficients. These equalization or filter coefficients eliminate precisely the effects which are brought about by the transmission channel CH, which is characterized by its transfer function C(f). The equalization filter EF therefore has a filter function which corresponds to the inverse of the channel transfer function C(f). The equalization filter EF thus provides at least one partial signal improvement as a result of the compensation for the measurable channel effects.

The equalized received signal is processed in a decision-maker unit E which associates the frequency values which have the greatest probability of being transmitted with the corresponding received and equalized frequency values and decodes the single QAM signals. To recover the transmitted data DS, parallel-serial conversion PSW is then performed and is output as received data DE.

FIG. 5 shows the cyclic expansion of a DMT symbol. Following the Inverse Fast Fourier Transformation, each symbol comprises 2*N samples, where N is the number of carrier signals used in the DMT modulation method. For cyclic expansion, the first $L_{CS}$ samples are appended to the DMT symbol as a cyclic suffix and the last $L_{CP}$ samples are added before the DMT symbol as a cyclic prefix, as illustrated in FIG. 5. In the case of DMT, the channel is equalized using the guard interval which is formed by the cyclic prefix. By inserting this safety interval between two successive transmitted symbols, the channel memory is completely switched off, which means that the intersymbol interference ISI decreases. The cyclic suffix is required in the case of VDSL in order to perform "Digital Duplexing". In the case of "Digital Duplexing", the transmitted and received signals in the two transceivers are shifted relative to one another such that no symbol limit in the transmitted signal interferes with the FFT of the received signal. This means that a VDSL system operating "digital duplexing" does not require an echo cancellation unit.

In addition, VDSL transceivers perform windowing of the cyclically expanded DMT symbol, as illustrated in FIG. 6. In this case, a predetermined number (β) of samples from the start and at the end of the cyclically expanded DMT symbol is multiplied by a window function in order to form the spectrum for the transmitted signal. This involves the sidebands of the DMT signal being lowered, so that interference for other frequency bands is minimized. The lowering of the sidebands in the case of VDSL is necessary in order to observe the permitted power spectrum density. In ADSL transceivers, no windowing of the cyclically expanded DMT symbol is performed.

In the case of transceivers based on the VDSL standard or the VDSL-2 standard, the cyclic continuation of the discrete multitone signal is switched on right at the start of the training phase. Switching on the cyclic continuation or the cyclic expansion right at the start of the training phase allows the complexity of the hardware of the VDSL transceiver to be kept relatively low, since it is not necessary to alter the data transmission rates at a later time. In addition, switching on the cyclic continuation during the actual training phase allows the transmitted signal to be constantly overlaid with or multiplied by a window function, so that the sidebands are lowered.

However, the result of switching on the cyclic continuation right at the start of the training phase in conventional VDSL transceivers is that the cyclically continued DMT signals can be used to train the equalizers and other adaptive signal processing blocks at the receiver end only with difficulty and with poor performance.

FIG. 7A shows a training signal which comprises a sequence of cyclically expanded training symbols, each cyclically expanded training symbol comprising a cyclic prefix (CP) and a cyclic suffix (CS).

FIG. 7B shows the associated time signal for a very simple example in which the signal is modulated merely with a carrier signal. The carrier signal is sinusoidal. As can be seen from FIG. 7, the boundaries between the cyclically expanded training symbols, i.e. times t0, t1, t2, t3, have signal discontinuities or sudden amplitude changes which prevent optimum setting of the equalizers. For digital duplexing, however, the provision of a cyclic prefix (CP) is indispensable in VDSL transceivers.

In ADSL transceivers based on the prior art, the equalizers and the other adaptive signal processing blocks are able to be set by virtue of the cyclic continuation not being switched on at the start of the training phase. Only at a later time is the cyclic continuation switched in within the training phase in ADSL transceivers. This is possible because ADSL transceivers have an echo cancellation unit and do not use digital duplexing. In addition, a window function is not normally used to lower the sidebands. This is normally done in ADSL transceivers using digital filters. Changeover from a training phase without cyclic continuation to a training phase with cyclic continuation increases the circuit complexity within ADSL transceivers substantially, however.

SUMMARY OF THE INVENTION

It is an object of the present invention to provide a method and an apparatus for generating a training signal in which, despite cyclic continuation being constantly switched on during the training phase, the equalizer and the other adaptive signal processing blocks at the reception end can be set in better fashion.

The object is achieved in accordance with the invention by means of a method for generating a periodic training signal, which comprises cyclically expanded training symbols, for a transceiver which transmits data via a data transmission channel using a predetermined number (N) of modulated carrier signals, where for each training symbol an address pointer for addressing a starting address in a memory is calculated on the basis of cyclic expansion parameters and, starting from the calculated starting address, 2*N stored samples of a transformed training symbol are read cyclically from the training symbol memory.

The cyclic expansion parameters may comprise a prefix length, a suffix length and a windowing length. The address pointer may initially be initialized to a particular value and then a current address pointer is iteratively calculated on the basis of the cyclic expansion parameters and the previously calculated address pointer.

The current address pointer may particularly be calculated as follows:

$$AP_{i+1} = AP_i + L_{CP} + L_{CS} - \beta \quad (1)$$

where $AP_i$ is the value of the previously calculated address pointer,
$L_{CP}$ is the prefix length,
$L_{CS}$ is the suffix length and
$\beta$ is the windowing length.

In a restricted version of the inventive method, a prescribed training symbol is transformed by Inverse Fast Fourier Transformation from the frequency domain to the time domain in order to produce the 2N samples. The samples produced by Inverse Fast Fourier Transformation may be written to the memory.

The object is also achieved in accordance with the invention by means of an apparatus for generating a periodic training signal, which comprises cyclically expanded training symbols, for a transceiver which transmits data via a data transmission channel using a predetermined number (N) of modulated carrier signals, having:
(a) a memory for storing 2N samples of a transformed training symbol, and having
(b) a control logic unit which calculates, for each training symbol, an address pointer for addressing a starting address on the basis of cyclic expansion parameters and which, starting from the calculated starting address, cyclically reads the samples stored in the memory.

DESCRIPTION OF THE DRAWINGS

FIG. 9 is a flowchart of a preferred embodiment of the inventive method for generating a periodic training signal;
and
FIG. 10 is a signal graph to explain the way in which the inventive method for generating a periodic training signal works.

DESCRIPTION OF THE PREFERRED EMBODIMENTS

Figure 1:
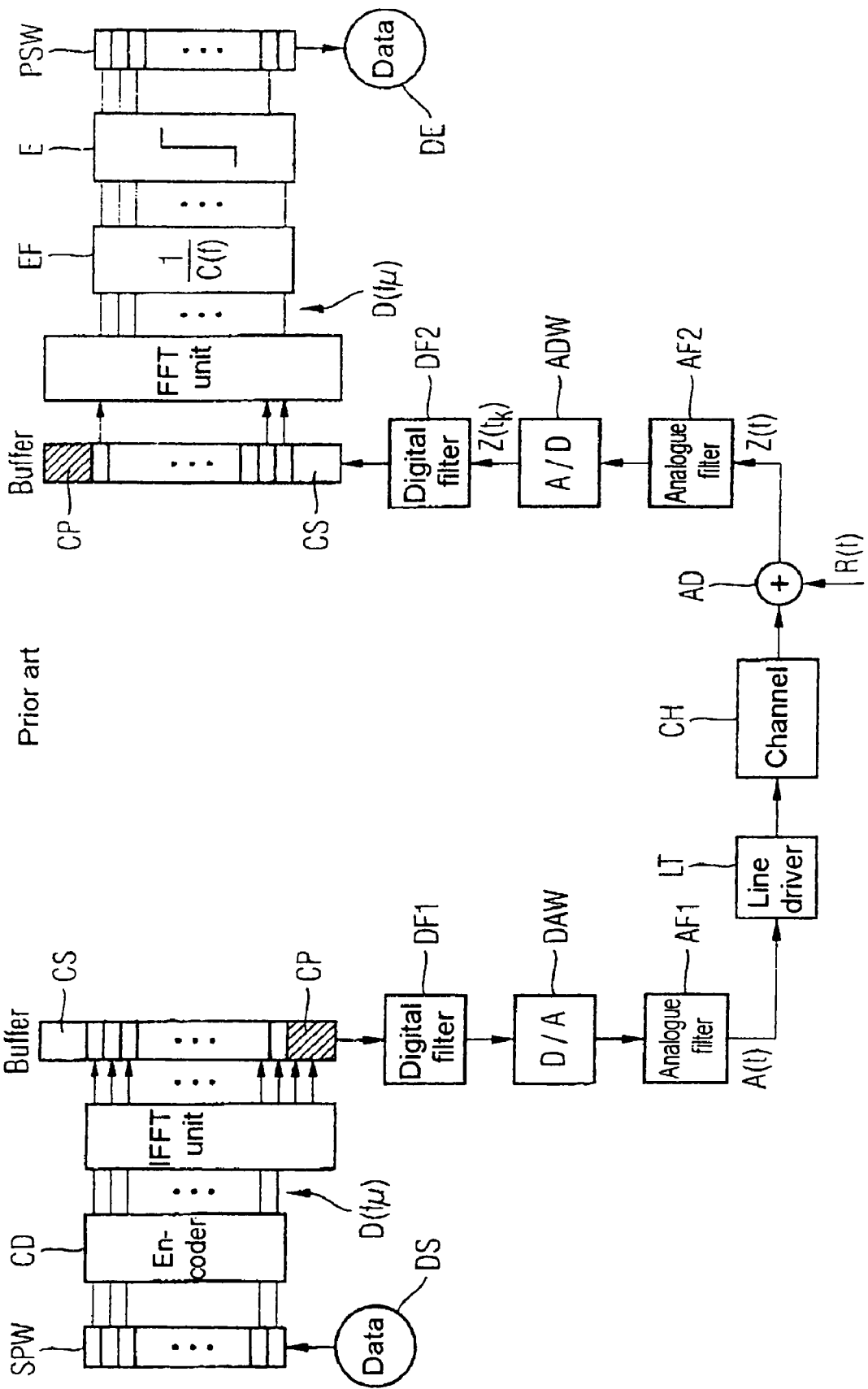
FIG. 1, as discussed above, is a DMT transmission system based on the prior art.
Figure 2:
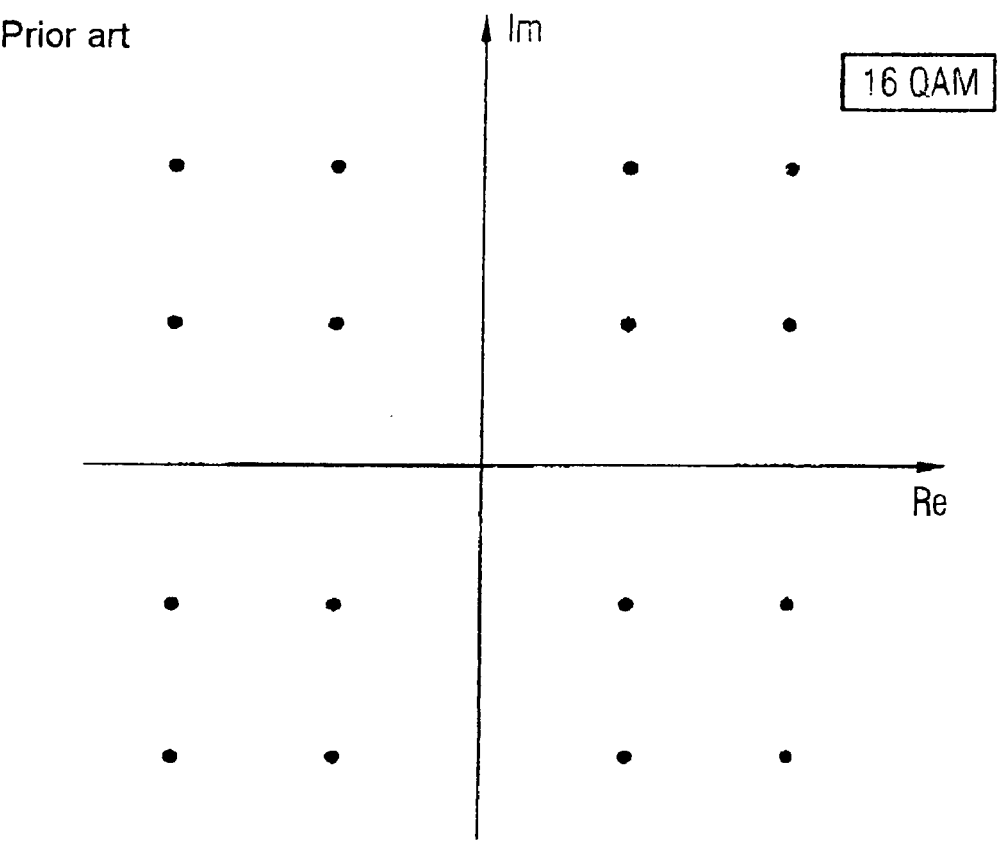
FIG. 2, as discussed above, is the configuration for a conventional 16QAM encoder based on the prior art.
Figure 3:
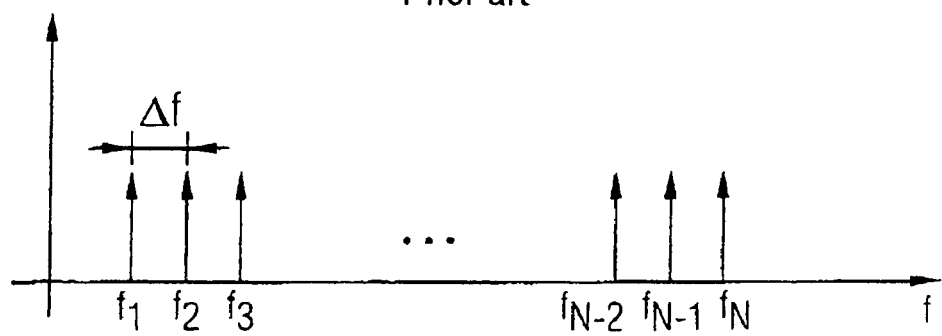
FIG. 3, as discussed above, is the frequency spectrum for a DMT modulated signal based on the prior art.
Figure 4:
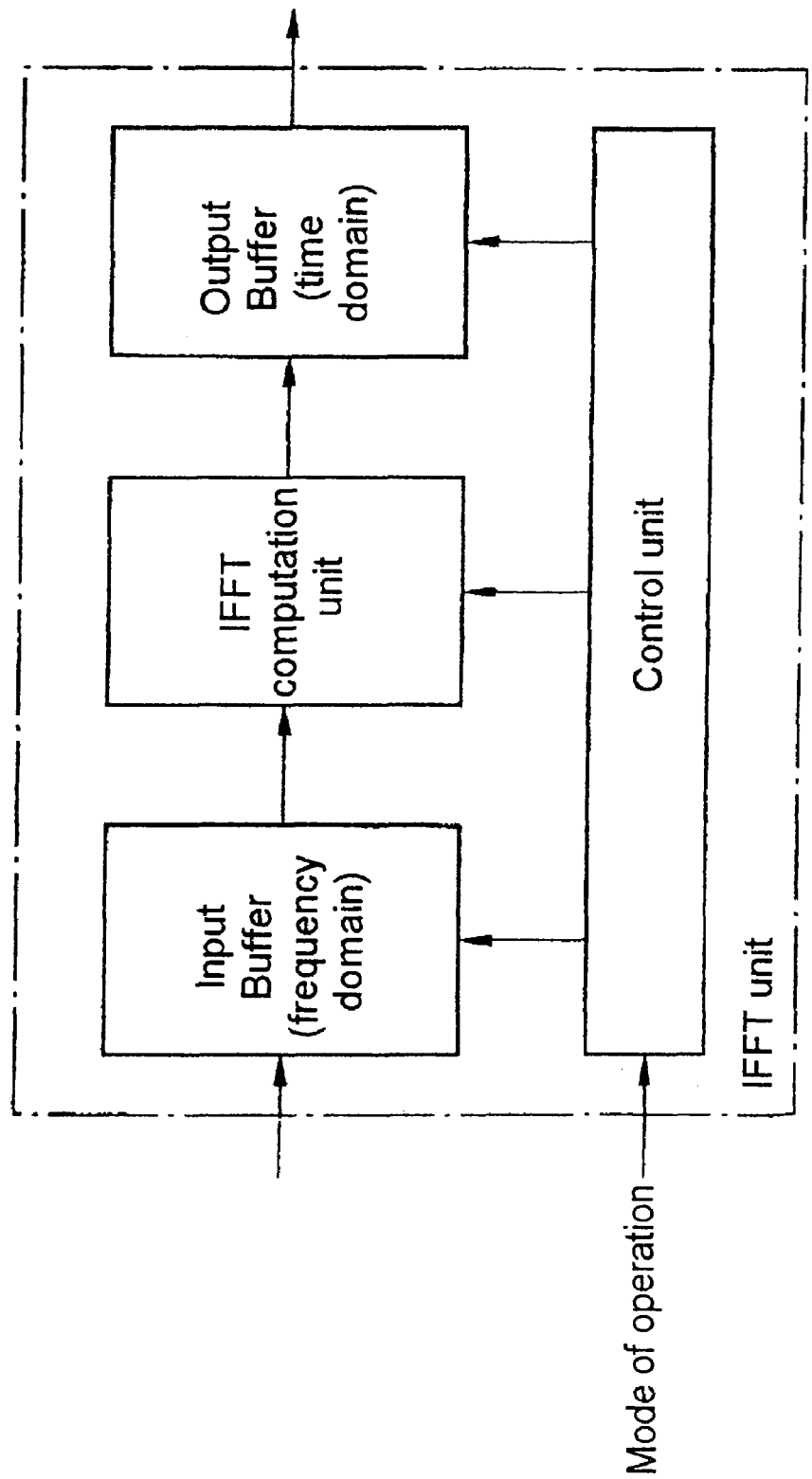
FIG. 4, as discussed above, is an IFFT unit based on the prior art.
Figure 5:
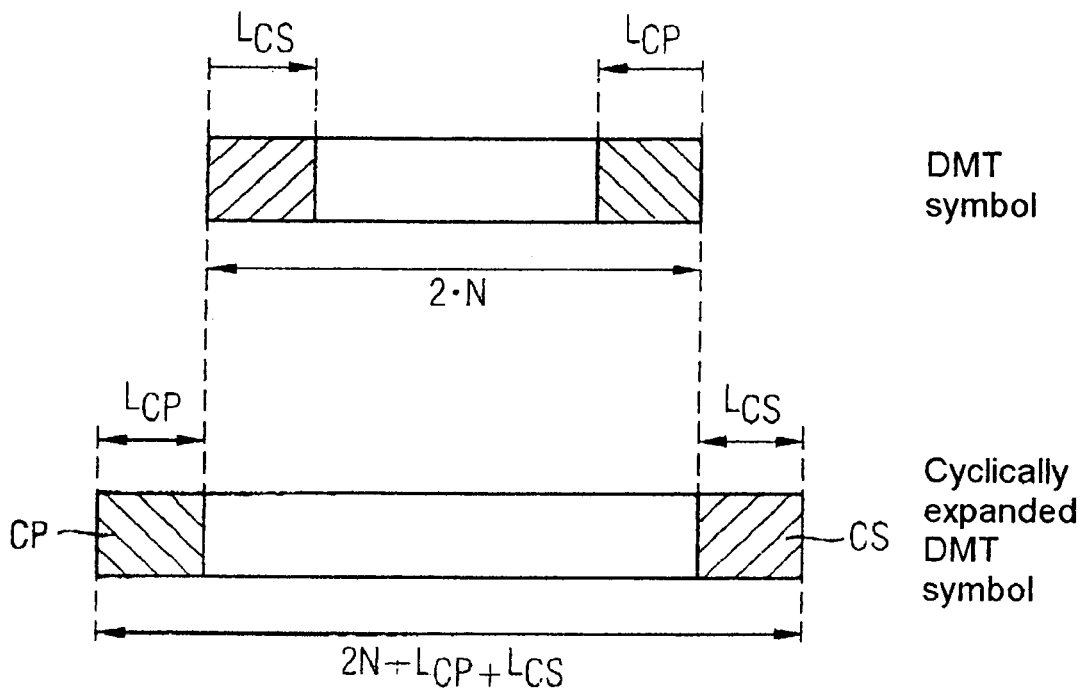
FIG. 5, as discussed above, is a graph to explain the cyclic expansion of a DMT symbol based on the prior art.
Figure 6:
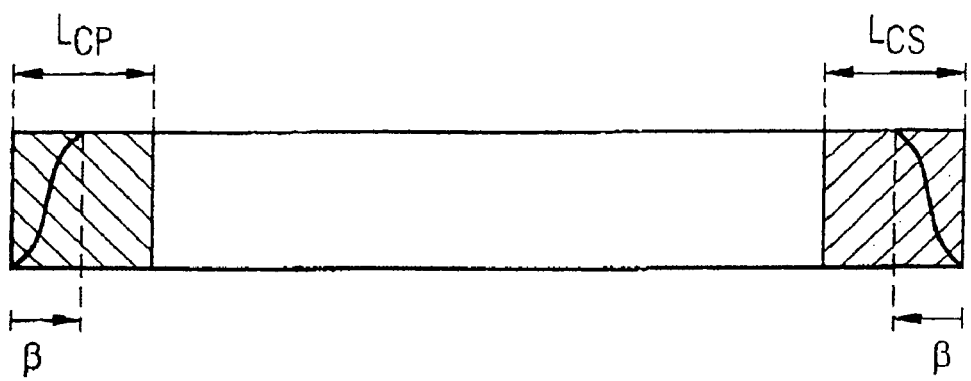
FIG. 6, as discussed above, is a graph to explain the windowing of a cyclically expanded DMT symbol based on the prior art.
Figure 7:
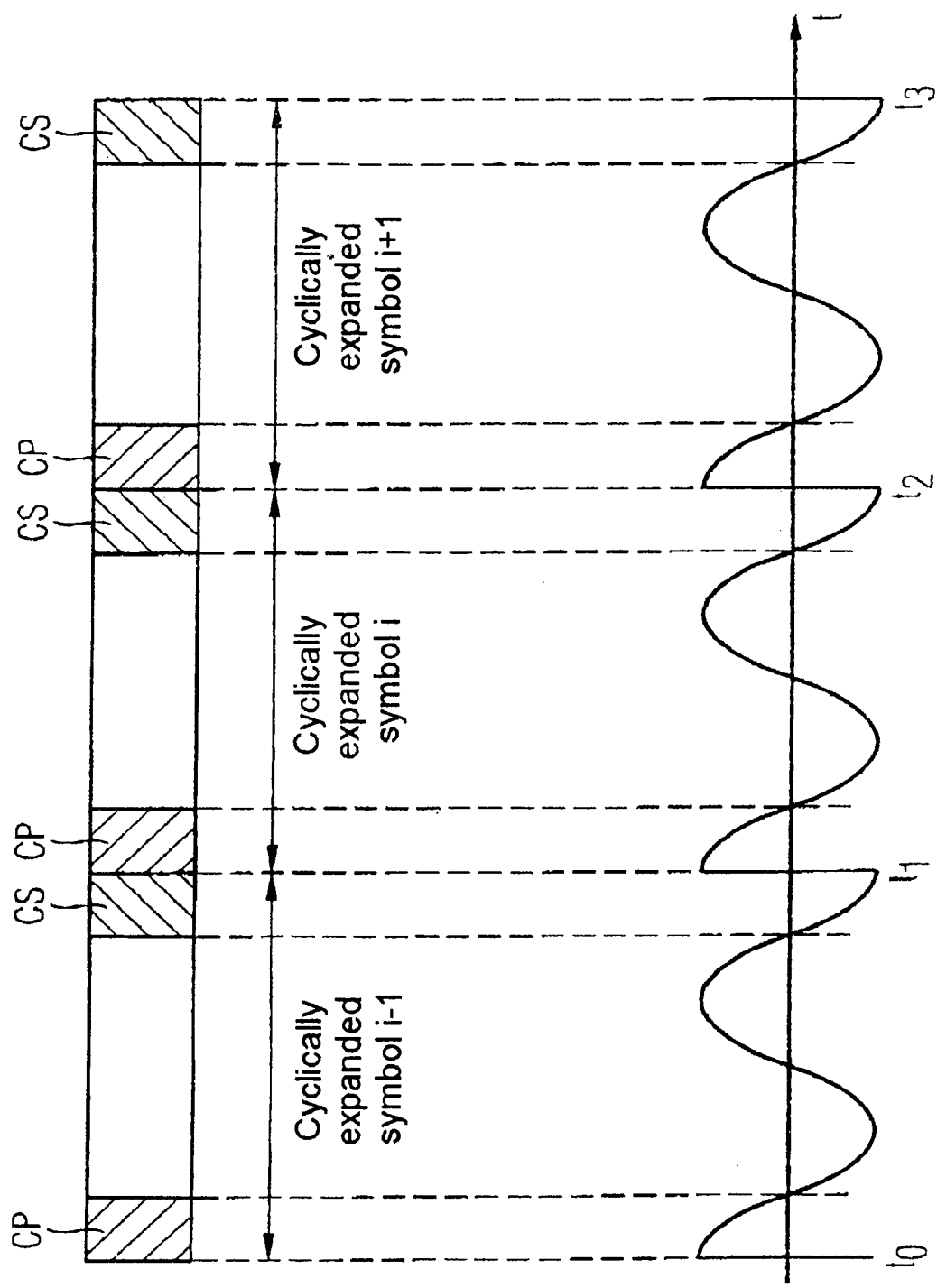
FIG. 7, as discussed above, is a sequence of cyclically expanded DMT symbols to explain the problems underlying the invention.
Figure 8:
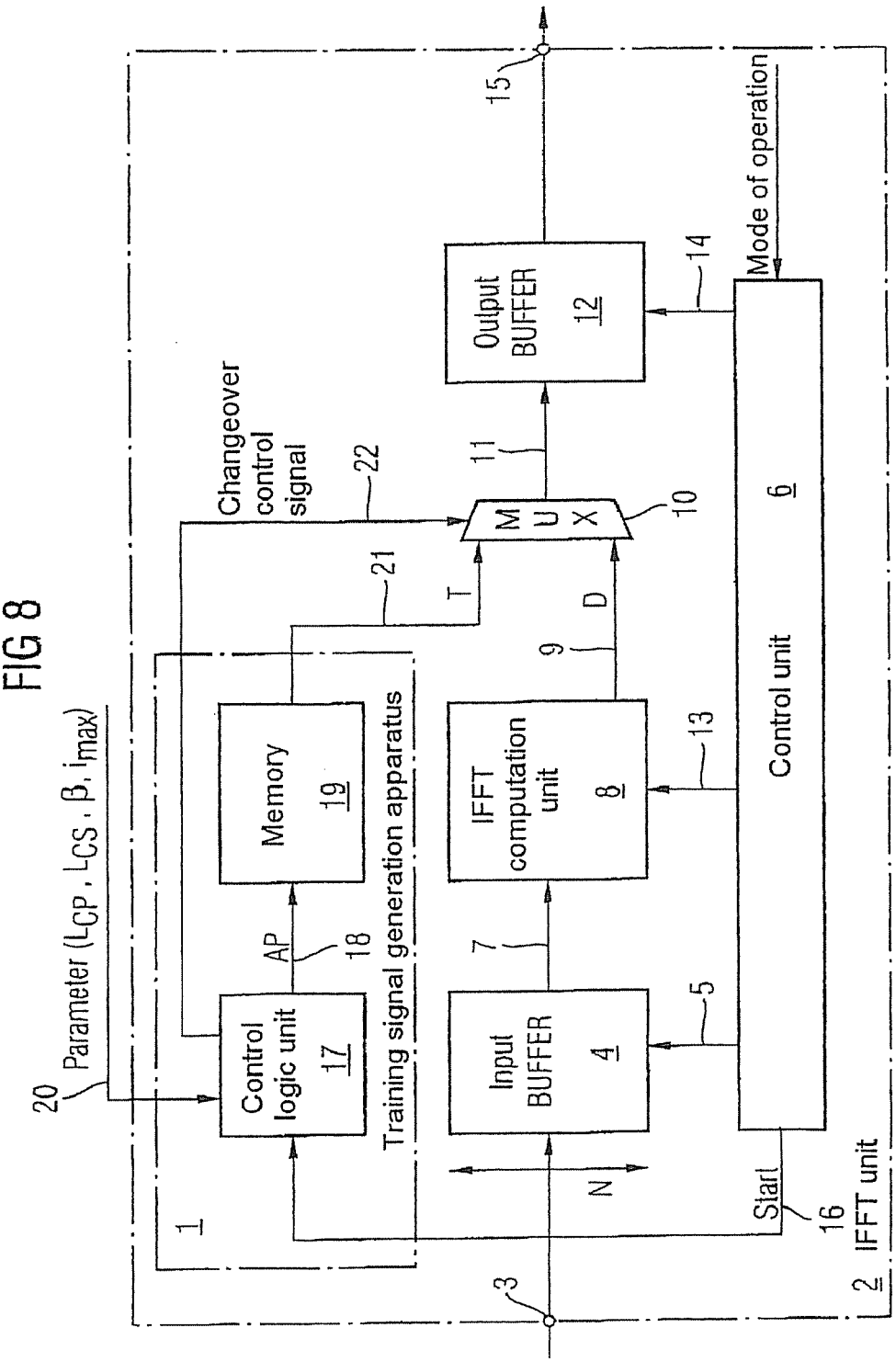
FIG. 8, is a block diagram of an IFFT unit which comprises an inventive training signal generation apparatus.

As can be seen from FIG. 8, the inventive training signal generation apparatus 1 forms part of an IFFT unit 2 within a transceiver. The IFFT unit 2 has a signal input 3 which is used to read data from an upstream encoder into a frequency range buffer 4. The size of the input or frequency range buffer 4 covers N memory cells at 16 bits each, for example. The number N corresponds to the number of carrier signals used in the multicarrier modulation method which is used. Examples of such multicarrier modulation methods are the DMT method and the OFDM method. The real part and the imaginary part of a QAM symbol produced in the encoder are stored. By way of example, the first 8 bits of the memory cell form the real part and the second 8 bits of the memory cell reproduce the imaginary part of the QAM symbol. The input buffer 4 is actuated by a control unit 6 via control lines 5. The control unit 6 reads N QAM symbols into the input buffer 4 in blocks. At the output, the input buffer 4 is connected to an IFFT computation unit 8 via data lines 7. The IFFT computation unit 8 performs Inverse Fast Fourier Transformation for the buffer-stored QAM symbols. In a normal data transmission mode of operation, the symbols transformed from the frequency domain to the time domain are buffer-stored in the output buffer 12 as samples via data lines 9 by a multiplexer 10 via lines 11. The control unit 6 uses control lines 13 to actuate the IFFT computation unit 8. This involves the Inverse Fourier Transformation being started as soon as a complete block comprising N QAM symbols has been written to the input buffer. The control unit 6 uses control lines to control the reading of the DMT symbols from the IFFT unit 2 from a signal output 15 of the IFFT unit 2.

The IFFT unit 2, as illustrated in FIG. 8, has a training signal generation apparatus 1 in line with the invention. The control unit 6 in the IFFT unit 2 uses a control line 16 to send a start signal to a control logic unit 17 within the training signal generation apparatus 1 at the start of the training phase. For each training symbol, the control logic unit 17 calculates an address pointer (AP) for addressing a starting address on the basis of cyclic expansion parameters ($L_{CP}$, $L_{CS}$, $\beta$). The control logic unit 17 uses address lines 18 to apply the calculated address pointer to a memory 19 within the training signal generation apparatus 1. Starting at the calculated starting address, the samples of a transformed training symbol which are stored in the memory are read cyclically. In one preferred embodiment, the cyclic expansion parameters can be set externally using setting lines 20. Alternatively, the expansion parameters are implemented or stored permanently within the control logic unit 17. The samples of the transformed training symbol which are read from the memory 19 are applied to a second input of the multiplexer 10 via a data line 21. The control logic unit 17 uses a control line 22 to control the changeover of the multiplexer 10 between its two inputs. In a normal data transmission mode of operation, the output of the IFFT computation unit 8 is connected to the output buffer 12 by means of the multiplexer 10. During the training phase, the multiplexer 10 is changed over to the other signal input by the control logic unit 17, so that during the training phase the samples which are read from the memory 19 are written to the output buffer 12. The cyclic expansion parameters are particularly a settable prefix length $L_{CP}$, a settable suffix length $L_{CS}$ and a length $\beta$ for setting the windowing length in the VDSL mode of operation.

The control logic unit 17 in the inventive training signal generation apparatus 1, as illustrated in FIG. 8, executes the method shown as a flowchart in FIG. 9. In a step S1, the control logic unit 17 waits for the start signal, which is output to the control logic unit 17 by the control unit 6 via the control line 16. As soon as the start signal has been received, a symbol counter for the number of DMT symbols which are to be sent during the training phase is initialized to zero.

In a step S3, the control logic unit 17 changes over the multiplexer from the signal input 9 to the signal input 21.

Next, an address pointer is initialized to a predetermined value, for example to $L_{CP}$ (prefix length), in a step S4.

In a step S5, 2*N samples are read cyclically from the memory 19 and are written to the output buffer 12 via the multiplexer 10.

In a step S6, the address pointer (AP) for addressing a starting address is updated on the basis of the cyclic expansion parameters for the next read operation. This involves calculating the current address pointer $AP_{i+1}$ on the basis of the previously calculated address pointer $AP_i$ and the cyclic expansion parameters, i.e. prefix length $L_{CP}$, suffix length $L_{CS}$ and the windowing length $\beta$, as follows:

$$AP_{i+1} = AP_i + L_{CP} + L_{CS} - \beta$$

If the calculated current address pointer value $AP_{i+1}$ is greater than 2N, this comparison being made in a step S7, the current address pointer value $AP_{i+1}$ is corrected in step S8 as follows:

$$AP_{i+1} = AP_{i+1} - 2N$$

In a step S9, the symbol counter i is incremented.

In a step S10, the incremented symbol counter is compared with the number of training symbols provided in the training phase. If the symbol counter has reached the number of provided DMT symbols during the training phase, the control logic unit 17 switches back the multiplexer 10 from the signal input 21 to the signal input 9 for normal data transmission in a step S11. If, conversely, step S10 establishes that the provided number of training symbols has not yet been reached, 2N samples are again read cyclically from the memory 19 in step S5, starting with the updated address value $AP_{i+1}$.

FIG. 10 schematically shows the read operation using the address pointer AP for cyclically reading 2N samples of a training symbol from the memory 19. The cyclic reading of the samples during the training phase produces a periodic training signal without sudden amplitude changes with a signal period of 2N. Since the training signal produced has no discontinuities or sudden signal changes, it is possible, at the reception end, to set or train the equalizer and the other adaptive signal processing blocks in optimum fashion without difficulty. Since the cyclic continuation or expansion is constantly switched on during the training phase, the circuitry or complexity of a transceiver containing the inventive training signal generation apparatus 1 is also relatively slight.

In one preferred embodiment, the samples stored in the memory 19 are formed by virtue of the IFFT computation unit 8 transforming a desired training symbol stored in the input buffer 4 from the frequency domain to the time domain and then writing it to the memory 19. This does not have to be performed in real time, but rather can be carried out before the start of the training phase. If the periodic data sequence is intended to be sent in the training phase then the samples are read from the memory 19, but with the starting address being altered for each symbol and the symbol being read cyclically.

Although modifications and changes may be suggested by those skilled in the art, it is the intention of the inventor to embody within the patent warranted heron all changes and modifications as reasonably and properly come within the scope of his contribution to the art.

I claim as my invention:

1. A method for generating a periodic training signal comprising cyclically expanded training symbols for a transceiver which transmits data via a data transmission channel using a predetermined number N of modulated carrier signals of a multicarrier data transmission, comprising:
    (a) initializing an initial address pointer to a predetermined value, wherein the initial address pointer comprises an address in a memory;
    (b) starting from the address, reading cyclically from the memory 2*N stored samples to generate a first transformed training symbol;
    (c) calculating a subsequent address pointer using the initial address pointer and one or more cyclic expansion parameters, thereby defining a calculated address pointer;
    (d) starting from an address associated with the subsequent address pointer, reading cyclically from the memory 2*N stored samples to generate a subsequent transformed training symbol;
    (e) calculating a next calculated address pointer using an immediately previous calculated address pointer and one or more cyclic expansion parameters;
    (f) starting from an address associated with the next calculated address pointer, reading cyclically from the memory 2*N stored samples to generate the next transformed training symbol; and
    (g) repeating acts (e) and (f) until a predetermined number of transformed training symbols are generated.

2. The method of claim 1, wherein said one or more cyclic expansion parameters comprise a prefix length, a suffix length, and a windowing length.

3. The method of claim 2, wherein calculating the next calculated address pointer comprises:
    $AP_{i+1} = AP_i + L_{CP} + L_{CS} - \beta$,
    where $AP_{i+1}$ is the next calculated address pointer,
    $AP_i$ is the value of the immediately previous calculated address pointer,
    $L_{CP}$ is the prefix length,
    $L_{CS}$ is the suffix length, and
    $\beta$ is the windowing length.

4. The method of claim 1, further comprising transforming a prescribed set of training symbols by Inverse Fourier Transformation from the frequency domain to the time domain in order to produce the 2*N samples.

5. The method of claim 4, wherein the Inverse Fourier Transformation is an Inverse Fast Fourier Transformation.

6. The method of claim 4, further comprising writing the samples produced by the Inverse Fourier Transformation to the memory.

7. The method of claim 1, wherein the method is carried out in accordance with an orthogonal frequency division multiplexing (OFDM) scheme, or a quadrature amplitude modulation (QAM) scheme.

8. The method of claim 1, wherein the periodic training symbol is produced without sudden amplitude changes therein.

9. A training signal generation apparatus within a transceiver for generating a periodic training signal that comprises cyclically expanded training symbols for the transceiver which transmits data via a data transmission channel using a predetermined number N of modulated carrier signals of a multicarrier data transmission; said training signal generator apparatus comprising:
- a memory configured to store 2*N samples of a transformed training symbol; and
- a control logic unit configured to calculate, for each of the training symbols, an address pointer configured to point to a starting address in the memory, wherein the address pointer is calculated based on one or more cyclic expansion parameters, and wherein the control logic unit is further configured to control a cyclical reading of the samples stored in the memory, starting from the calculated starting address to produce the periodic training signal with a signal period of 2N corresponding to individual training symbols, wherein the periodic training signal trains adaptive processing blocks at a reception end;

wherein the control unit is further configured to initially initialize the address pointer to a particular value in generating a first training symbol of the periodic training signal; and wherein the control unit is further configured to calculate iteratively each subsequent address pointer based on one or more cyclic expansion parameters and a previous one of the calculated address pointers.

10. The apparatus of claim 9, further comprising:
an input buffer for storing bits corresponding to a plurality of QAM symbols.

11. The apparatus of claim 10, further comprising:
an inverse Fourier transformation (IFFT) computation unit to perform IFFT for QAM symbols in the input buffer.

12. The apparatus of claim 11, further comprising:
an output buffer; and
a multiplexer configured to selectively couple one of the memory and the IFFT computation unit in alternate fashion to the output buffer based on whether the apparatus is operating in a training mode or a normal transmission mode, respectively.

13. The apparatus of claim 12, wherein the control logic unit is configured to provide a control signal to the multiplexer to selectively couple one of the memory and the IFFT computation unit to the output buffer in an alternate fashion.

14. The apparatus of claim 9, wherein the apparatus is configured to carry out an orthogonal frequency division multiplexing (OFDM) scheme, or a quadrature amplitude modulation (QAM) scheme.

15. The apparatus of claim 9, wherein the periodic training symbol is produced without sudden amplitude changes therein.

* * * * *